US007709986B2

(12) United States Patent
Schild et al.

(10) Patent No.: US 7,709,986 B2

(45) Date of Patent: May 4, 2010

(54) DIRECT DRIVE FOR A CYLINDER OF A CONVERTING MACHINE

(75) Inventors: Helmut Schild, Steinbach/Ts. (DE); Toni Ehrhard, Breuberg (DE)

(73) Assignee: DITF Deutsche Institute fur Textil-und Faserforschung, Denkendorf (DE)

( * ) Notice: Subject to any disclaimer, the term of this patent is extended or adjusted under 35 U.S.C. 154(b) by 662 days.

(21) Appl. No.: 11/578,622

(22) PCT Filed: Apr. 8, 2005

(86) PCT No.: PCT/EP2005/003692

§ 371 (c)(1),
(2), (4) Date: Jan. 5, 2007

(87) PCT Pub. No.: WO2005/100022

PCT Pub. Date: Oct. 27, 2005

(65) Prior Publication Data

US 2008/0041252 A1 Feb. 21, 2008

(30) Foreign Application Priority Data

Apr. 16, 2004 (DE) ...................... 10 2004 019 136

(51) Int. Cl.
*H02K 47/00* (2006.01)
*B41F 5/16* (2006.01)

(52) U.S. Cl. ...................................... 310/112; 101/181

(58) Field of Classification Search ................. 310/112, 310/113, 114, 266; 101/248, 477, 480, 180, 101/181, 183
See application file for complete search history.

(56) References Cited

U.S. PATENT DOCUMENTS

| | | | | |
|---|---|---|---|---|
| 3,717,092 | A | 2/1973 | Crum | |
| 4,137,845 | A | 2/1979 | Jeschke | |
| 6,118,195 | A | 9/2000 | Hauer | |
| 6,267,056 | B1 | 7/2001 | Kolbe et al. | |
| 6,408,748 | B1 * | 6/2002 | Hajek et al. | 101/177 |
| 6,655,278 | B2 * | 12/2003 | Kawabata | 101/248 |

(Continued)

FOREIGN PATENT DOCUMENTS

EP 1000737 A1 5/2000

(Continued)

*Primary Examiner*—Quyen Leung
*Assistant Examiner*—Leda Pham
(74) *Attorney, Agent, or Firm*—Leydig, Voit & Mayer, Ltd.

(57) ABSTRACT

The invention relates to a direct drive for a cylinder of a converting machine, in particular a printing press or coating machine that converts sheet-type printed materials. The aim of the invention is to develop a direct drive for a cylinder of the afore-mentioned type in such a way that the required lateral corrections are significantly reduced. To this end, the direct drive includes a rotor (14) that is detachably mounted on the end of the cylinder (6, 10) and a stator (15) that is concentric with the rotor and is detachably fixed to the side frame (13). A register motor (16), which is fixed to the frame, is coupled to gearing (17, 18) and this gearing (17, 18) is coupled to a helical gear or screw drive (19, 2, 21, 22), which is in turn coupled to the cylinder (6, 10) by means of an axial/rotative coupling (23, 24).

12 Claims, 3 Drawing Sheets

U.S. PATENT DOCUMENTS

| | | | |
|---|---|---|---|
| 6,779,446 | B2 | 8/2004 | Hajek et al. |
| 6,901,854 | B2 | 6/2005 | Masuch |
| 7,000,539 | B2 | 2/2006 | Hajek et al. |

FOREIGN PATENT DOCUMENTS

| | | | |
|---|---|---|---|
| EP | 1132202 | A1 | 9/2001 |
| EP | 1162064 | A2 | 12/2001 |
| EP | 0621133 | A1 | 10/2002 |
| EP | 1277575 | A1 | 1/2003 |
| EP | 1377457 | B1 | 1/2004 |
| WO | WO 98/06581 | A1 | 2/1998 |
| WO | WO 02/076743 | A1 | 10/2002 |

* cited by examiner

DIRECT DRIVE FOR A CYLINDER OF A CONVERTING MACHINE

FIELD OF INVENTION

The invention relates to a direct drive for a cylinder of a converting machine. The independently driveable cylinder can be used in a printing press or coating machine processing sheet-like printing material (sheet material).

BACKGROUND OF THE INVENTION

A controllable direct drive for a converting machine is disclosed in EP 0 812 683 A1. According to this reference, a plate cylinder or a rubber blanket cylinder of at least one printing unit can be driven by an individual drive decoupled from the gear train of an offset sheet printing press preferably provided for the transport of sheet material. In one embodiment, the plate cylinder or the plate cylinder and the rubber blanket cylinder can be driven so as to perform circumferential register corrections relative to the other cylinders. In another configuration, the plate cylinder and/or the rubber blanket cylinder can be driven so as to perform print repeat range corrections relative to the other cylinders. If necessary, a lateral register correction can be accomplished using a mechanical system that is not disclosed in the reference in detail in that the plate cylinder mounted in the side frames is mounted so that it can move in the axial direction of the plate cylinder next to the associated drive.

BRIEF SUMMARY OF THE INVENTION

A general object of the present invention is developing a direct drive for a cylinder of a converting machine in which the required lateral register corrections are substantially reduced.

One advantage of the invention is that, in addition to directly driving an individual cylinder—and if necessary its circumferential register correction—a separate lateral register correction can also be achieved with less effort.

Another advantage is that a compact, space-saving construction can be achieved for an individual drive of a cylinder by utilizing a direct drive and separate lateral register correction. In a preferred embodiment, no additional installation space is required because a separate drive for possible lateral register corrections is fixed to the frame. In particular the separate lateral register drive is arranged in the interior of a drive motor fixed to the frame for the direct drive—and if necessary for the circumferential register correction—of the cylinder.

It is a further advantage that when performing a lateral register correction, only the rotating drive part of the direct drive that is supported in the side frames can move in the axial direction.

Another advantage is that the independently driveable cylinders can be constructed as plate cylinders in offset printing presses and/or form cylinders in coating units of converting machines with direct drives, if necessary with circumferential sheet register correction, and a separate lateral register correction.

Another advantage is that an intermediate gear decoupled from the direct drive and belonging to a closed gear train can be incorporated with the direct drive. The gear train can be provided for the transport of sheet-like printing material. Therefore, another assembly, in particular an inking unit, a dampening unit and/or at least one form roller of a metering device, of the converting machine can be driven in a space-saving manner.

BRIEF DESCRIPTION OF HE DRAWINGS

DETAILED DESCRIPTION OF THE INVENTION

Figure 1:
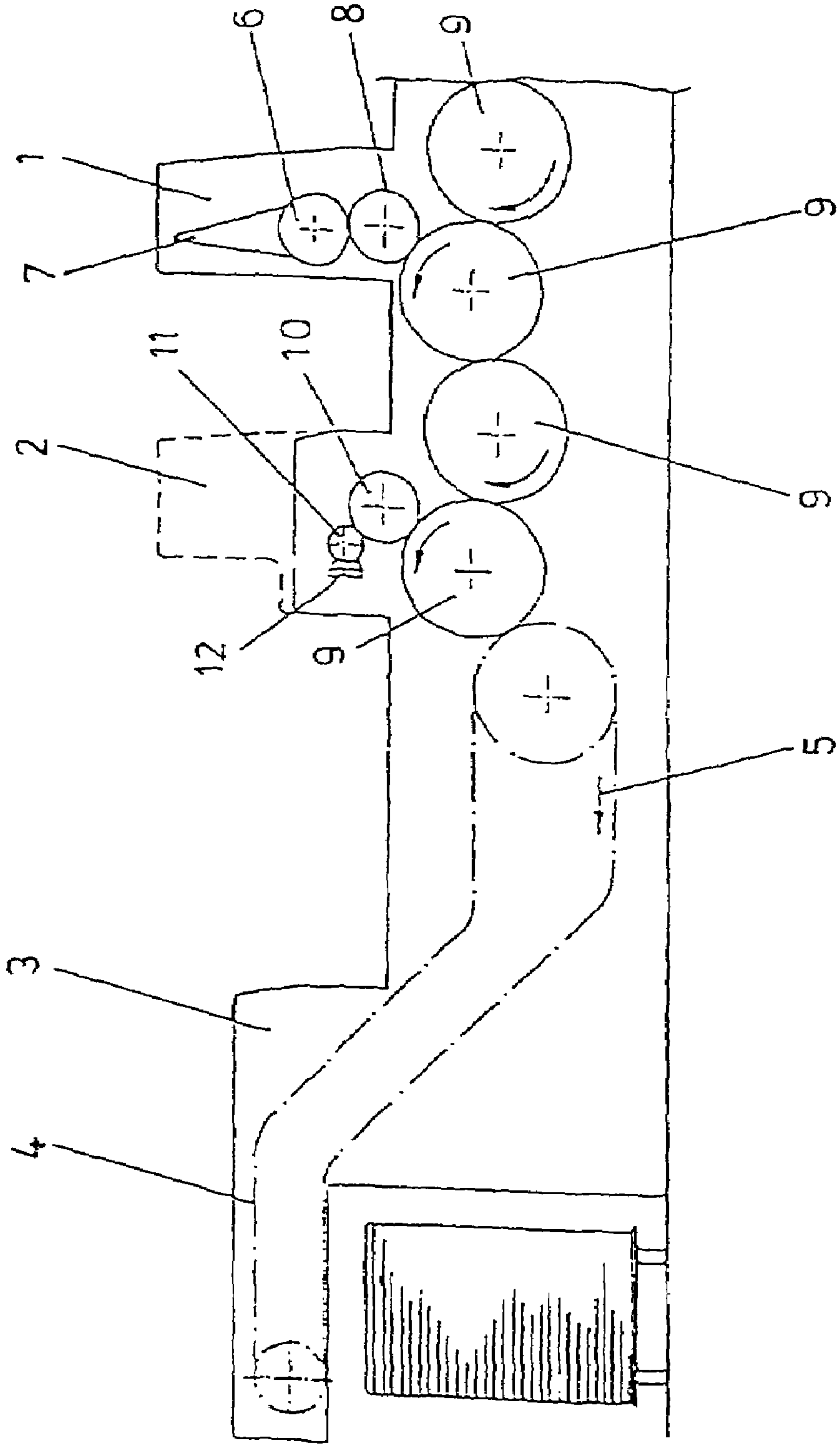
FIG. 1 is a schematic side view of an illustrative rotary printing press having a printing unit and a coating unit.

A converting machine for sheet-like printing material has, for example, several printing units 1 and at least one coating unit 2. Referring to FIG. 1, a known printing unit 1 is shown which includes a rubber blanket cylinder 8, a plate cylinder 6, and also an inking unit 7 assigned to the plate cylinder 6. If necessary, a dampening unit (not shown) can be assigned to the plate cylinder 6. A coating unit 2, which includes a form cylinder 10 and a metering device 11, 12, is arranged downstream of the printing unit 1 in the transport direction 5 of the printing material. In the illustrated example, the metering system 11, 12 is formed by a latched form roller 11 and an ink chamber blade system 12.

A sheet delivery unit 3 that includes an endless, rotating transport system 4 for the transport and arrangement of the sheet-like printing material on a stack is arranged after or downstream of the coating unit 2 in the transport direction 5. The rubber blanket cylinder in the printing unit 1, the form cylinder 10 in the coating unit 2, and also transport cylinders 9 between the printing/coating units 1, 2 are provided for transporting the printing material. In the illustrated embodiment, the transport cylinders 9 are formed as sheet-guiding cylinders and are connected on the drive side to a continuous gear train (i.e., a closed gear train), which is coupled to and can be driven with a main drive.

In the first embodiment discussed below, the rubber blanket cylinder 8 of each printing unit 1 is coupled mechanically with the gear train for the transport cylinder 9. In the second embodiment, it is decoupled from this gear train, i.e., it has a separate direct drive (individual drive). Each plate cylinder 6 and each form cylinder 10 has a separate direct drive (individual drive), which is mechanically decoupled from the gear train of the transport cylinder 9 and which can be driven in a defined manner relative to these transport cylinders 9 and, if necessary, relative to each rubber blanket cylinder 8.

Figure 2:
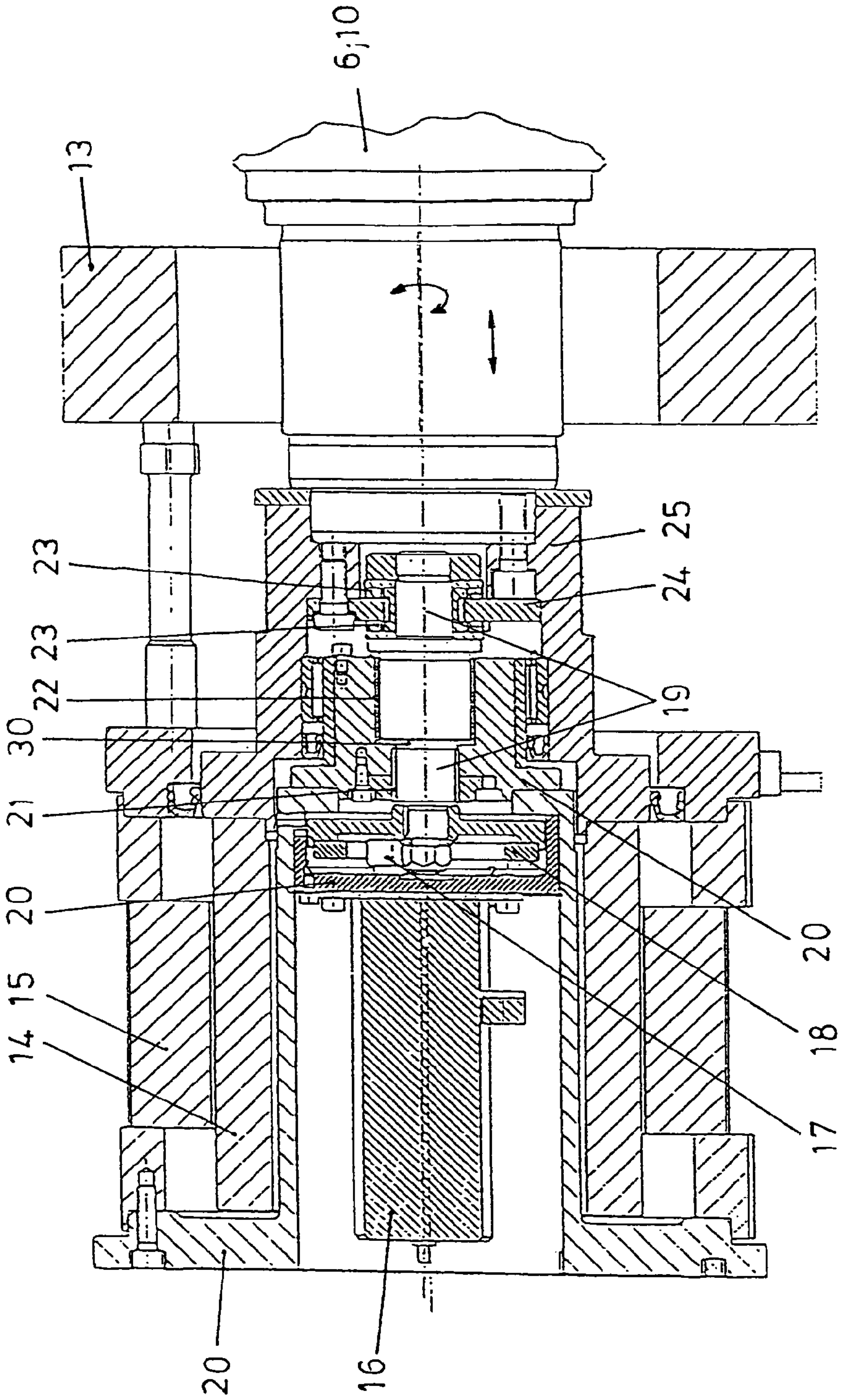
FIG. 2 is a schematic side sectional view of an exemplary direct drive with lateral correction for a cylinder according to the invention.

Because each direct drive of the plate cylinder 6 and form cylinder 10 in each printing/coating unit 1, 2 is identical, only one drive on a plate cylinder 6 or a form cylinder 10 will be explained with respect to the first embodiment of the invention shown in FIG. 2. The direct drive is detachably mounted to an end of the plate/form cylinder 6, 10. The direct drive comprises a rotor 14, which is detachably mounted to the plate/form cylinder 6, 10, and a stator 15. The stator 15 is concentrically arranged relative to the rotor and is detachably fixed to the side frame 13. A register motor 16 is fixed to the frame and is coupled with a gear drive 17, 18. The gear drive 17, 18 is coupled in the direction of the plate/form cylinder 6, 10 with a screw drive. The screw drive is, in turn, coupled with the plate or form cylinder 6, 10 by an axial/rotating coupling 23, 24. In a preferred embodiment, the rotor 14 has an annular construction and the register motor 16 is arranged in the interior of the rotor 14. The register motor 16 is preferably coupled (i.e., through circuitry) to a machine controller of the converting machine.

The gear drive 17, 18 includes a pinion gear 17 on the register motor 16 and a second gear 18, for example, an internally-toothed gear 18 that engages the pinion gear 17. The second gear 18 is coupled to the screw drive in that the second gear 18 is fixed to an end of a register shaft 19, which forms part of the screw drive. In the direction of the plate or form cylinder 6, 10, the register shaft 19 has a threaded spindle 21 that forms a screw link in a mounting structure 20 fixed to the frame, which also forms part of the screw drive. One end of the register shaft 19 is mounted in the mounting structure 20 via an axial guide 22, preferably a bushing, which further forms part of the screw drive. The coupling 23, 24 is on the other end of the register shaft 19. The coupling includes a two-sided axial bearing 23 on the register shaft 19 and a preferably annular disk 24 that is coupled with the rotor 14 and which rotatively engages the two-sided axial bearing 23. The annular disk 24 engages the two-sided axial bearing 23 in such a manner that the disk rotates freely. The disk 24 is connected in a detachable manner to the form/plate cylinder 6, 10. The rotor 14 is preferably connected in a detachable manner to the plate/form cylinder 6, 10 by a flange 25 and the disk 24 is fixed on the flange 25 in a detachable manner.

Figure 3:
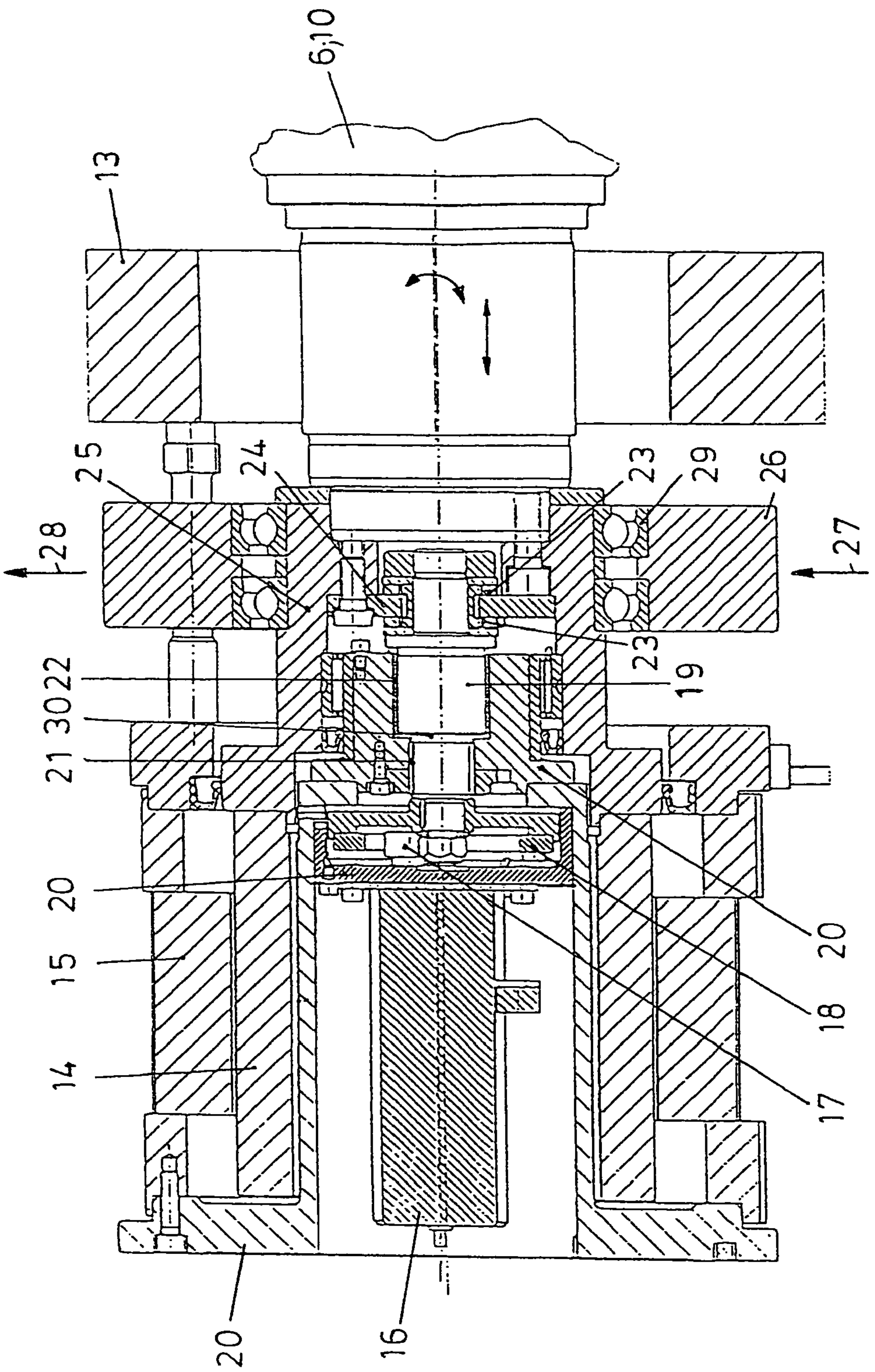
FIG. 3 is a schematic side sectional view of another embodiment of a direct drive with lateral correction for a cylinder in which an additional inking or coating unit drive is decoupled from the direct drive.

As in the first embodiment, the direct drives for individually driving the plate/form cylinders 6, 10 are identical in the second embodiment illustrated in FIG. 3. Accordingly, only one such drive will be explained in detail. The direct drive has a rotor 14 detachably arranged at the ends to the plate/form cylinder 6, 10 and a stator 15. The stator 15 is concentric to the rotor and which is detachably fixed on the side frame 13. The rotor 14 is coupled a flange 25 with the plate/form cylinder 6, 10. A bearing 29, which carries an intermediate gear 26 that can rotate freely, is arranged circumferentially (concentrically) on the flange 25. The intermediate gear 26 is decoupled from the direct drive for the plate/form cylinder 6, 10.

An input drive 27 can be fed onto the intermediate gear 26 by the gear train of the transport cylinder 9 for printing material transport, and an output drive 28 onto another assembly can be accomplished through this intermediate gear 26. Preferably, the output drive acts on an inking unit 7. Alternatively, the output drive acts on a dampening unit of a printing unit 1 or on the form roller 11 of a metering device 11, 12 of a coating unit 2.

Preferably, a register motor 16 is arranged in the interior of the annular rotor 14 that is fixed to the frame and is coupled with a gear drive 17, 18. The gear drive 17, 18 is coupled with a screw drive, which in turn is coupled with the cylinder 6, 10 by an axial/rotating coupling 23, 24. The register motor 16 preferably communicates via appropriate circuitry with a machine controller.

The gear drive 17, 18 is formed by a pinion gear 17 on the register motor 16 and a second gear 18 engaging with the pinion gear 17. The second gear 18 is coupled with the screw drive, in that the second gear 18 is fixed at the ends on a register shaft 19. The register shaft 19 includes a threaded spindle 21 in the direction of the platform cylinder 6, 10, which forms a screw link in a mounting 20 fixed to the frame. The register shaft 19 is supported in the mounting 20 by an axial guide 22, for example, a bushing. The coupling is at the other end of the register shaft 19. The coupling includes a two-sided axial bearing 23 on the register shaft 19 and a preferably annular disk 24. The disk 24 is coupled with the rotor 14 and rotatively engages in the axial bearing 23. The annular disk 24 engages in the two-sided axial bearing 23 so that it rotates freely. The disk 24 is detachably connected to the plate or form cylinder 6, 10. Preferably, in both embodiments, the register motor 16, along with the mounting 20 and the stator 15, are detachably mounted on the side frame 13.

The operation of an exemplary drive according to the invention is as follows. The direct drive (rotor 14, stator 15) is driven in the specified way as an individual drive for the plate cylinder 6 or form cylinder 10. For lateral correction of the plate/form cylinder 6, 10, the register motor 16 is activated, preferably by the machine controller, and drives the pinion gear 16 (according to the specified rotational direction) and the engaged gear 18. The gear 18 drives the register shaft 19 that produces a rotational movement about the register shaft 19 axis combined with a displacement movement in the axial direction (towards or away from the plate/form cylinder 6, 10) by means of the screw link (threaded spindle 21, mounting 20). The displacement movement (in the axial direction) of the register shaft 19 is performed according to a specified stroke 30 in the guide 21 fixed to the frame, and acts on the disk 24 via the two-sided axial bearing 23. Because the disk 24 is connected to the plate/form cylinder 6, 10, an axial displacement (represented by a double arrow) of the plate or form cylinder 6, 10 is effected in the side frame 13 in connection with the rotor 14.

LIST OF REFERENCE SYMBOLS

1 Printing unit
2 Coating unit
3 Delivery unit
4 Transport system
5 Transport direction
6 Plate cylinder
7 Inking unit
8 Rubber blanket cylinder
9 Transport cylinder
10 Form cylinder
11 Form roller
12 Ink chamber blade
13 Side frame
14 Rotor
15 Stator
16 Register motor
17 Pinion gear
18 Gear
19 Register shaft
20 Holder
21 Threaded spindle
22 Guide (axial)
23 Axial bearing
24 Disk
25 Flange
26 Intermediate gear
27 Input drive
28 Output drive
29 Bearing
30 Stroke

The invention claimed is:

1. A direct drive for a cylinder of a converting machine with at least one printing or coating unit, wherein the cylinder is mounted in a side frame and is mechanically decoupled from a printing material transport drive acting on one or more sheet transport cylinders of the printing or coating unit, the direct drive comprising:

a rotor detachably mounted to an end of the cylinder, the rotor having an annular construction;

a stator concentrically arranged relative to the rotor and detachably mounted on the side frame;

a register motor supported on the side frame and coupled with a gear drive, the register motor being arranged in the interior of the rotor; and a screw drive coupled to the gear drive, the screw drive being coupled to the cylinder by an axial/rotating coupling.

2. The direct drive according to claim 1 wherein:

the rotor is coupled by circuitry to a machine controller;

the gear drive is formed by a pinion gear on the register motor and a second gear engaging with the pinion gear;

the second gear is coupled with the screw drive with the second gear being fixed to a register shaft, the register shaft having a threaded spindle that forms a screw link in a mounting structure fixed to the frame, a first end of the register shaft being mounted to the mounting by an axial guide; and the axial/rotating coupling being arranged a second end of the register shaft, the axial/rotative coupling including a two-sided axial bearing on the register shaft and a disk that is coupled with the rotor and rotatively engages the axial bearing.

3. The direct drive according to claim 1 wherein the cylinder is a plate cylinder.

4. The direct drive according to claim 1 wherein the cylinder is a form cylinder.

5. The direct drive according to 2 wherein the register motor, the mounting structure and the stator are detachably mounted on the side frame.

6. The direct drive according to claim 2 wherein the rotor is detachably connected to the cylinder by a flange and the disk detachably fixed to the flange.

7. A direct drive for a cylinder of a converting machine with at least one printing or coating unit, wherein the cylinder is mounted in a side frame and is mechanically decoupled from a printing material transport drive acting on one or more sheet transport cylinders of the printing or coating unit, the direct drive comprising a rotor detachably mounted to an end of the cylinder;

a stator concentrically arranged relative to the rotor and detachably mounted on the side frame, the rotor being coupled with the cylinder by a flange;

a bearing that supports a freely rotating intermediate gear is arranged on a circumference of the flange; and an input drive engageable with the intermediate gear so as to produce an output drive for driving another assembly of the converting machine.

8. The direct drive according to claim 7 further including a register motor supported on the side frame, the register motor being coupled with the gear drive and being arranged in an interior of the rotor, the gear drive being coupled with a screw drive that is coupled with the cylinder by an axial/rotative coupling.

9. The direct drive according to claim 8 wherein:

the register motor is coupled by circuitry to a machine controller;

the gear drive is formed by a pinion gear on the register motor and a second gear engaging with the pinion gear;

the second gear is coupled with the screw drive with the second gear being fixed to a register shaft, the register shaft having a threaded spindle that forms a screw link in a mounting structure fixed to the frame, a first end of the register shaft being mounted to the mounting by an axial guide; and the axial/rotating coupling being arranged a second end of the register shaft, the axial/rotative coupling including a two-sided axial bearing on the register shaft and a disk that is coupled with the rotor and rotatively engages the axial bearing.

10. The direct drive according to claim 7 wherein the other assembly of the converting machine driven via the input drive engageable with the intermediate gear comprises a component of a metering device.

11. The direct drive according to claim 7 wherein the cylinder is a plate cylinder.

12. The direct drive according to claim 7 wherein the cylinder is a form cylinder.

* * * * *

UNITED STATES PATENT AND TRADEMARK OFFICE

CERTIFICATE OF CORRECTION

PATENT NO. : 7,709,986 B2
APPLICATION NO. : 11/578622
DATED : May 4, 2010
INVENTOR(S) : Helmut Schild et al.

It is certified that error appears in the above-identified patent and that said Letters Patent is hereby corrected as shown below:

On the title page under (73) Assignee:

Delete:

DITF Deutsche Institute fur Textil-und Faserforschung, Denkendorf, Germany and Replace with:

-- manroland AG, Offenbach, Germany --

Signed and Sealed this
Twenty-ninth Day of March, 2011

David J. Kappos
*Director of the United States Patent and Trademark Office*